(12) United States Patent
Chun et al.

(10) Patent No.: US 8,291,226 B2
(45) Date of Patent: Oct. 16, 2012

(54) METHOD AND APPARATUS FOR SECURELY BOOTING FROM AN EXTERNAL STORAGE DEVICE

(75) Inventors: Dexter Tamio Chun, San Diego, CA (US); Ajit B. Patil, San Diego, CA (US); Cuneyt Fitoz, San Diego, CA (US); Dwight Gordon, San Diego, CA (US); Yu-Hsiang Huang, San Diego, CA (US); Oliver Michaelis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1153 days.

(21) Appl. No.: 11/351,966

(22) Filed: Feb. 10, 2006

(65) Prior Publication Data
US 2007/0192610 A1    Aug. 16, 2007

(51) Int. Cl.
| | |
|---|---|
| H04L 9/32 | (2006.01) |
| H04L 29/06 | (2006.01) |
| G06F 7/04 | (2006.01) |
| G06F 13/00 | (2006.01) |
| H04K 1/00 | (2006.01) |
| H04L 9/00 | (2006.01) |
| G06F 9/44 | (2006.01) |
| G06F 9/24 | (2006.01) |

(52) U.S. Cl. ............ 713/176; 726/27; 711/103; 713/164
(58) Field of Classification Search ................... 713/176, 713/164; 726/27; 711/103
See application file for complete search history.

(56) References Cited

U.S. PATENT DOCUMENTS
5,610,981 A    3/1997    Mooney et al.
(Continued)

FOREIGN PATENT DOCUMENTS
DE    10208442    5/2003
(Continued)

OTHER PUBLICATIONS

Kevin R.B. Butler, Stephen McLaughlin, Patrick D. McDaniel, "Rootkit-resistant disks", Oct. 2008, CCS '08: Proceedings of the 15th ACM conference on Computer and communications security, Publisher: ACM, pp. 403-415.*

(Continued)

*Primary Examiner* — Eleni Shiferaw
*Assistant Examiner* — Courtney D Fields
(74) *Attorney, Agent, or Firm* — Won Tae Kim (57) ABSTRACT

Techniques to securely boot up an electronics device (e.g., a cellular phone) from an external storage device are described. Secure data (e.g., a hash digest, a signature, a cryptographic key, and so on) is initially retrieved from a non-writable area of an external memory device (e.g., an one-time programmable (OTP) area of a NAND Flash device). A first program (e.g., a boot program) is retrieved from a writable or main area of the external memory device and authenticated based on the secure data. The first program is enabled for execution if authenticated. A second program may be retrieved from the main area of the external memory device and authenticated based on the secure data. The second program is enabled for execution if authenticated. Additional programs may be retrieved and authenticated. Each program may be authenticated using a secure hash function, a digital signature, and/or some other cryptographic technique.

31 Claims, 7 Drawing Sheets

U.S. PATENT DOCUMENTS

| | | |
|---|---|---|
| 6,106,396 A | 8/2000 | Alcorn et al. |
| 6,185,678 B1 | 2/2001 | Arbaugh et al. |
| 6,565,443 B1 | 5/2003 | Johnson et al. |
| 6,625,729 B1 | 9/2003 | Angelo et al. |
| 6,708,274 B2 | 3/2004 | Herbert et al. |
| 7,694,121 B2 | 4/2010 | Willman et al. |
| 2001/0007131 A1 | 7/2001 | Galasso et al. |
| 2003/0018892 A1* | 1/2003 | Tello .................. 713/164 |
| 2003/0028761 A1 | 2/2003 | Platt |
| 2003/0074550 A1 | 4/2003 | Wilks et al. |
| 2003/0079138 A1 | 4/2003 | Nguyen et al. |
| 2005/0091496 A1 | 4/2005 | Hyser |
| 2005/0193217 A1 | 9/2005 | Case et al. |
| 2005/0246518 A1 | 11/2005 | Takahashi |
| 2005/0251677 A1 | 11/2005 | Maeda et al. |
| 2007/0143530 A1* | 6/2007 | Rudelic et al. ............ 711/103 |
| 2009/0064125 A1 | 3/2009 | Venkatachalam et al. |
| 2009/0113558 A1 | 4/2009 | Prabhakaran et al. |

FOREIGN PATENT DOCUMENTS

| | | |
|---|---|---|
| JP | 7093980 A | 4/1995 |
| JP | 2002139996 A | 5/2002 |
| JP | 2002515765 A | 5/2002 |
| JP | 2003271391 A | 9/2003 |
| JP | 2003337748 A | 11/2003 |
| JP | 2004005585 A | 1/2004 |
| JP | 2004118826 A | 4/2004 |
| JP | 2004265286 A | 9/2004 |
| JP | 2005157528 A | 6/2005 |
| JP | 2006146485 A | 6/2006 |
| JP | 2006178909 A | 7/2006 |
| JP | 2006243780 A | 9/2006 |
| RU | 2005115918 A | 11/2006 |
| WO | WO9701902 A1 | 1/1997 |
| WO | 0021238 | 4/2000 |
| WO | 0150230 | 7/2001 |
| WO | WO 2006082985 A2 * | 8/2006 |

OTHER PUBLICATIONS

International Search Report, PCT/US07/061916, International Search Authority, European Patent Office, Nov. 27, 2007.

Written Opinion—PCT/US07/061916, International Search Authority, European Patent Office, Nov. 27, 2007.

* cited by examiner

METHOD AND APPARATUS FOR SECURELY BOOTING FROM AN EXTERNAL STORAGE DEVICE

BACKGROUND

I. Field

The present disclosure relates generally to electronics, and more specifically to techniques for securely booting an electronics device from an external storage device.

II. Background

An electronics device (e.g., a cellular phone) typically operates based on software and/or firmware that control the hardware within the device and support various designed functions. The software and/or firmware may be stored in an external non-volatile memory, loaded into a faster internal memory and/or an external volatile memory during power up, and executed by a processor. The external and internal memories are typically selected to provide the desired storage capacity and access capability and to be as economical as possible.

In many instances, it is desirable or necessary to ascertain whether the software and/or firmware retrieved from the external memory are valid and authorized for execution. For example, different software versions with different features may be available for different levels of service subscription. It may then be desirable to prevent an electronics device with a basic subscription from loading and executing a software version with enhanced functionality intended for a premium subscription. As another example, it may be desirable to prevent tampering with the software and/or firmware to enable features that are not authorized. In addition, far worse consequences such as network destruction and/or blackout may be caused by hostile parties.

SUMMARY

There is therefore a need in the art for techniques to store software and/or firmware in economical memories and to check the validity of the software and/or firmware retrieved from these memories.

Techniques to securely boot up an electronics device (e.g., a cellular phone) from an external storage device (e.g., a NAND Flash memory device) are described herein. Secure boot refers to a process of loading software programs from an external storage device and checking the validity of the loaded software programs. A software program may comprise software code, firmware code, or a combination of both.

The techniques described herein may utilize a non-writable area on the external storage device to store secure data that is practically non-alterable. The non-writable area may be a one-time programmable (OTP) area, a one-time write (OTW) area, etc. As used herein, secure data includes data that is not easily altered (e.g., data stored in an OTP area or an OTW area) as well as data that is authenticated by the not easily altered data. The secure data may comprise one or more hash digests, signatures, certificates, cryptographic keys, etc., or a combination thereof. The techniques utilize the secure data to authenticate software programs loaded from the external storage device, to allow authenticated programs to execute, and to prevent unauthorized programs from executing.

In an embodiment of the secure boot, secure data is initially retrieved from a non-writable area of an external memory device (e.g., an OTP area of a NAND Flash). A first program (e.g., a boot program) is retrieved from a writable or main area of the external memory device and authenticated based on the secure data. For example, the secure data may comprise a first hash digest. The first program may then be authenticated by (1) hashing the first program to generate a second hash digest and (2) comparing the first and second hash digests. The first program is enabled for execution if authenticated.

A second program may be retrieved from the main area of the external memory device and authenticated based on the secure data. For example, the secure data may comprise a cryptographic key, which may be stored in the non-writable area or authenticated by the data stored in the non-writable area. The second program may then be authenticated by (1) retrieving a certificate containing a first signature and a public key, (2) retrieving a second signature for the second program, (3) verifying the first signature with the cryptographic key to authenticate the certificate, and (4) verifying the second signature with the public key from the certificate to authenticate the second program. The second program is enabled for execution if authenticated. Additional programs may be retrieved and authenticated. Each program may be authenticated using a secure hash function, a digital signature, and/or some other cryptographic technique.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The secure boot techniques described herein may be used for various electronics devices such as those used for wireless communication, personal electronics, computing, networking, etc. The techniques may also be used with various storage devices having non-writable area, such as solid-state memory devices, memory cards, hard disks, compact discs (CDs), etc. A non-writable area is an area of a storage device that cannot be over-written with data. For example, the non-writable area may be an OTP area that can be programmed with data only once. The non-writable area may be used to store secure data that supports the secure boot process. For clarity, the techniques are described below for a wireless communication device having a NAND Flash memory with an OTP area.

Figure 1:
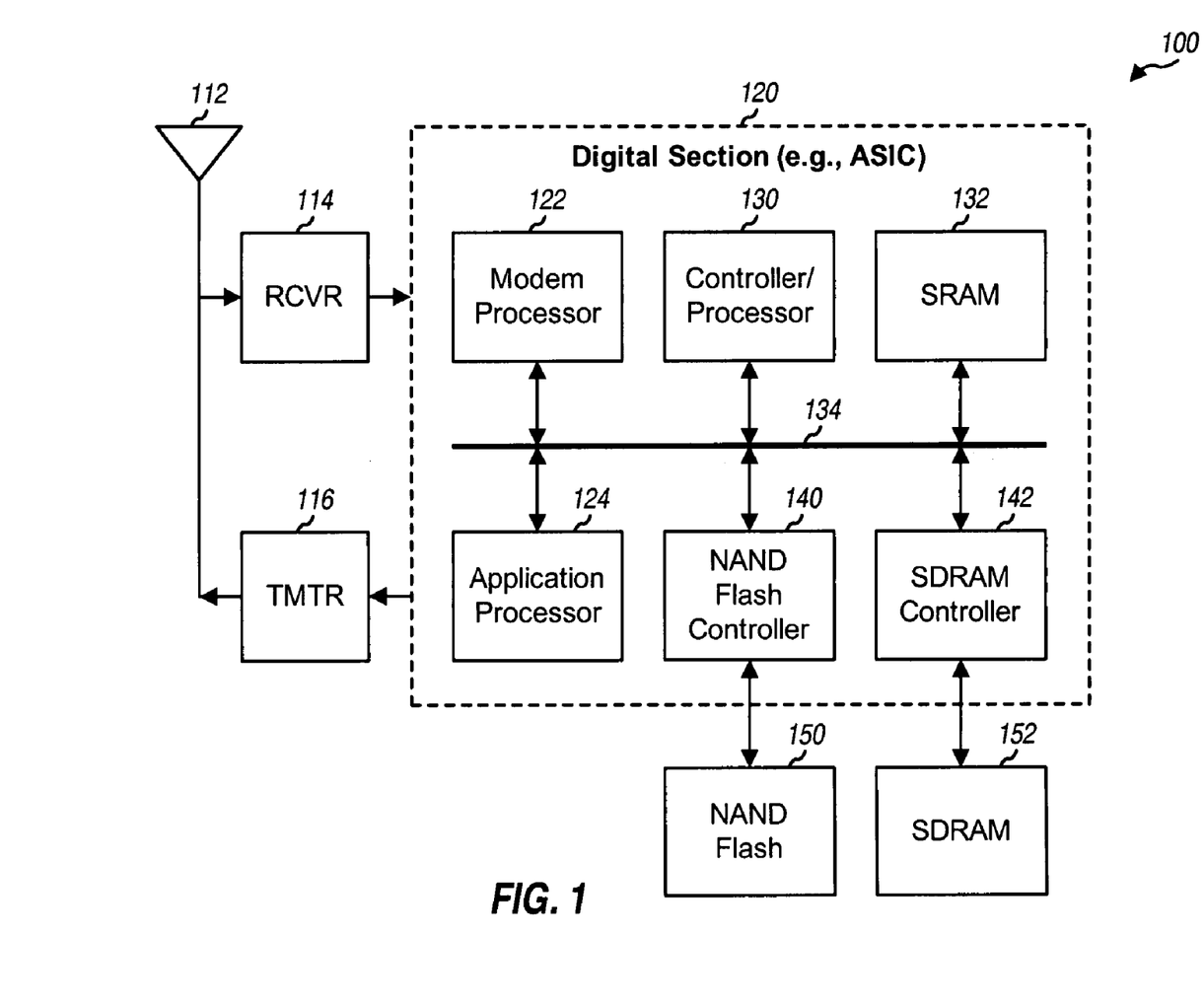
FIG. 1 shows a block diagram of a wireless communication device.

FIG. 1 shows a block diagram of a wireless communication device 100, which may be a cellular phone, a handset, a handheld device, a wireless module, a personal digital assistant (PDA), a terminal, a modem, or some other apparatus or device. Wireless device 100 is capable of providing bidirectional communication with one or more wireless communication systems via a receive path and a transmit path. On the receive path, signals transmitted by base stations are received by an antenna 112 and provided to a receiver (RCVR) 114. Receiver 114 conditions and digitizes the received signal and provides input samples to a digital section 120 for further processing. On the transmit path, a transmitter (TMTR) 116 receives and conditions data to be transmitted by wireless device 100 and generates a modulated signal, which is transmitted via antenna 112 to the base stations.

Digital section 120 includes various processing, interface, and memory units that support digital processing for wireless device 100. For the embodiment shown in FIG. 1, digital section 120 includes a modem processor 122, an application processor 124, a controller/processor 130, a static random access memory (SRAM) 132, a NAND Flash controller 140, and a synchronous dynamic RAM (SDRAM) controller 142, all of which may communicate with one another via one or more buses 134. Modem processor 122 performs processing for data transmission and reception (e.g., encoding, modulation, demodulation, decoding, etc). Application processor 124 may perform processing for audio, video, graphics, and/or other applications such as hash and verification algorithms. Controller/processor 130 may direct the operation of various units within digital section 120. SRAM 132 stores program codes and data used by the controllers and processors within digital section 120.

NAND Flash controller 140 facilitates transfer of data between a NAND Flash 150 and digital section 120. SDRAM controller 142 facilitates transfer of data between an SDRAM 152 and digital section 120. Controller/processor 130 may also direct the operation of NAND Flash controller 140 and/or SDRAM controller 142. Controller/processor 130 may direct data transfer from NAND Flash 150 to SRAM 132 and may further facilitate data transfer between NAND Flash 150 and SDRAM 152 during boot up, e.g., when wireless device 100 is powered on.

NAND Flash 150 and SDRAM 152 are memory devices that are external to digital section 120 and provide mass storage for the processing units within digital section 120. NAND Flash 150 provides non-volatile storage for program codes and data used by digital section 120. NAND Flash 150 may also be replaced with other types of non-volatile memory. SDRAM 152 provides storage with random access capability for program codes and data used by digital section 120. SDRAM 152 may also be replaced with other types of volatile memory (e.g., SRAM, DRAM, and so on) and/or non-volatile memory (e.g., NOR Flash).

In general, digital section 120 may include any number of processing, interface, and memory units. The controllers and processors within digital section 120 may be implemented with one or more digital signal processors (DSPs), microprocessors, reduced instruction set computing (RISC) processors, complex instruction set computing (CISC) processors, etc. Digital section 120 may be implemented on one or more application specific integrated circuits (ASICs) and/or some other types of integrated circuit (IC).

As shown in FIG. 1, wireless device 100 may utilize a memory architecture with different types of memory. SRAM and SDRAM are volatile memories that lose their data once power is removed. SRAM and SDRAM may be accessed in a random manner and are commonly used as the main run-time memory. Flash is a non-volatile memory that can retain its data even after power is removed. NAND Flash, which is one type of Flash, has large storage capacity, good speed for continued memory access, and low cost. However, NAND Flash has poor performance for random memory access and is typically accessed in units of pages, one page at a time, with each page being of a particular size (e.g., 512 bytes).

The memory architecture shown in FIG. 1 incorporates both NAND Flash and SRAM/SDRAM and is capable of providing large storage capacity with random access at reduced cost. For this memory architecture, program codes may be permanently stored in the NAND Flash. Upon being powered on, the wireless device performs a boot that entails (among other things) transferring the program codes from the NAND Flash to the SRAM/SDRAM.

The NAND Flash may store various software programs that control the hardware within the wireless device and further support various designed functions and features. A software program (or simply, a program) may comprise software codes, firmware codes, or a combination thereof. Firmware typically refers to program codes that are embedded in a hardware device such as a Flash or a read-only memory (ROM). Software typically refers to program codes that can be modified more easily than firmware.

The software programs stored in the NAND Flash may comprise a boot program that controls the boot up process and higher-layer programs that control the operation of the hardware and support the desired features and functions. The boot program may also be referred to as a boot code, a boot loader, etc. The higher-layer programs may include, e.g., a hardware initialization program that initializes various pieces of hardware within the wireless device, an operating system that is responsible for direct control and management of the hardware and basic system operations, application programs that support various applications (e.g., audio, video, graphics, and gaming, etc.), and/or other software programs. These various software programs may be dependent on one another and may be loaded in a sequential order during the boot up process.

The software programs may be programmed into the NAND Flash during manufacturing, downloaded into the NAND Flash during activation of the wireless device, etc. Regardless of how the software programs are loaded into the NAND Flash, it may be desirable or necessary to ascertain whether or not the software programs stored in the NAND Flash are authorized, to allow execution of programs that are authorized, and to prevent execution of programs that are unauthorized.

The techniques described herein support secure boot from an external storage device such as the NAND Flash. The secure boot checks each program retrieved from the NAND Flash and verifies whether the program is authorized for execution. The secure boot may be achieved using an OTP area of the NAND Flash and cryptographic techniques.

The NAND Flash includes a main area and an OTP area. The main area is a large area of the NAND Flash that can be written with data any number of times. The OTP area is typically a small area of the NAND Flash that can be programmed only once. The OTP area is for practical purposes non-alterable. The data stored in the OTP area is permanent and cannot be easily modified or tampered. The data from both the OTP area and the main area can be readily accessed or retrieved.

Figure 2A:
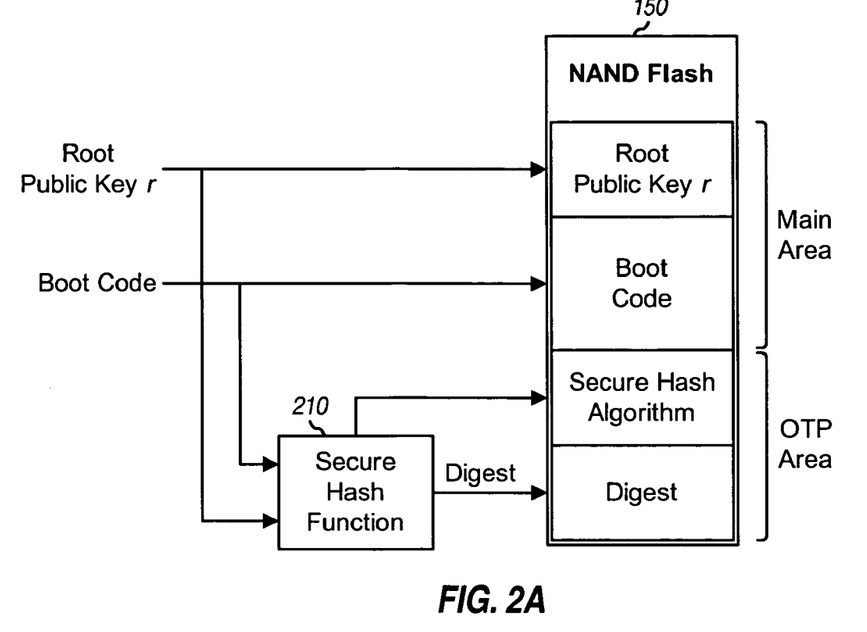
FIGS. 2A and 2B show a process to authenticate a boot program using a secure hash function.
Figure 2B:
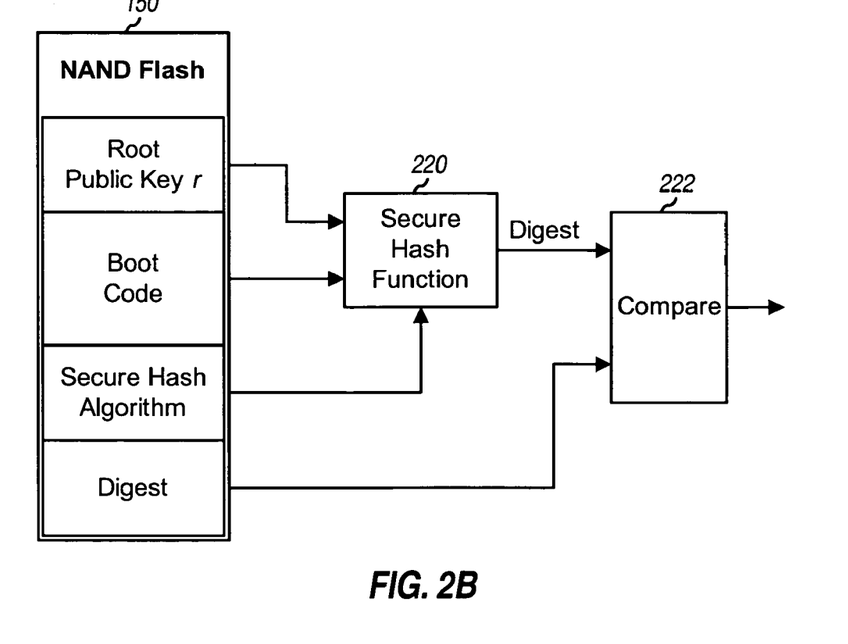

FIGS. 2A and 2B show an embodiment of a process to authenticate the boot code and a root public key r (described below) using a secure hash function. FIG. 2A shows the processing performed at a source entity, e.g., a manufacturer of the wireless device. For the embodiment shown in FIG. 2A, the boot code and the root public key r are used to form an input message that is hashed by a secure hash function 210 to generate a digest. The input message to secure hash function 210 may be any length, and the output digest is a pseudo-random bit string having a fixed length determined by the hash algorithm selected for use. Secure hash function 210 may implement SHA-1 (Secure Hash Algorithm), SHA-2 (which includes SHA-224, SHA-256, SHA-384 and SHA-512), MD-4 (Message Digest), MD-5, or some other secure hash algorithm known in the art. A secure hash algorithm has cryptographic properties so that the function between a message and its digest is irreversible, and the likelihood of two messages mapping to the same digest is very small. For the embodiment shown in FIG. 2A, the boot code and the root public key r are stored in the main area of the NAND Flash, and the digest and the secure hash algorithm are stored in the OTP area of the NAND Flash. In other embodiments, the root public key r and/or the boot code may be stored in the OTP area of the NAND Flash.

FIG. 2B shows the processing performed at the wireless device to authenticate the boot code and the root public key r. The boot code and the root public key r are retrieved from the NAND Flash and hashed by a secure hash function 220 to generate a digest. Secure hash function 220 implements the same secure hash algorithm used by secure hash function 210 at the source entity. This secure hash algorithm may be resident at the wireless device (not shown in FIG. 2B) or may be retrieved from the OTP area of the NAND Flash (as shown in FIG. 2B). The secure hash algorithm may also be stored in the form of code to be executed by a processor within ASIC 120. A compare unit 222 receives the digest stored in the OTP area of the NAND Flash and the digest generated by secure hash function 220, compares the stored digest against the generated digest, and declares that the boot code and the root public key r are authenticated if the two digests match. The digest stored in the OTP area cannot be easily tampered or replaced. The cryptographic properties of the secure hash algorithm ensure that the likelihood of another combination of boot code and root public key r mapping to the same digest stored in the OTP area is very small. Hence, any tampering with either the boot code or the root public key r by a third party can easily be detected by a mismatch between the generated digest and the stored digest.

Figure 3A:
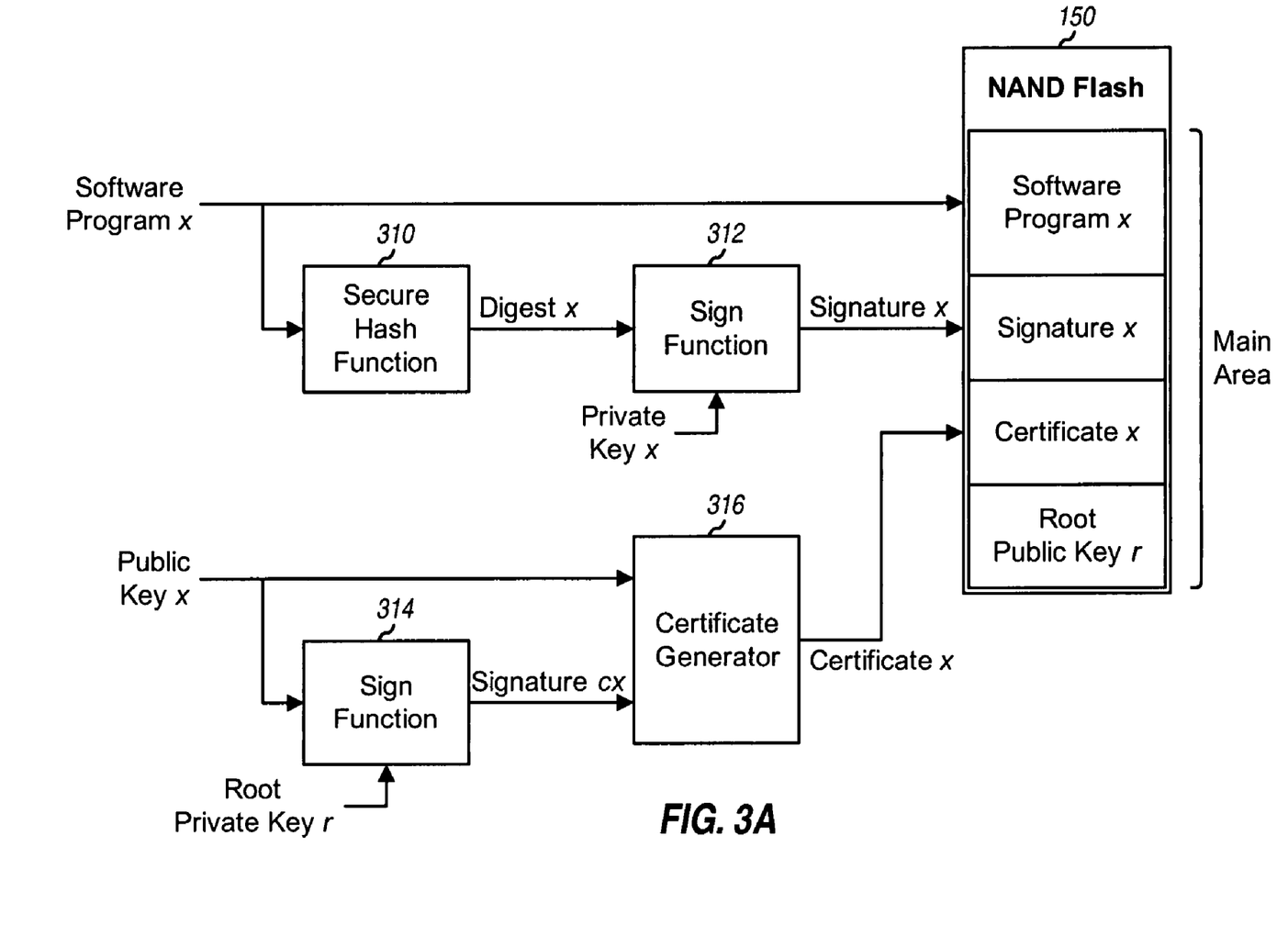
FIGS. 3A and 3B show a process to authenticate a software program using digital signature.
Figure 3B:
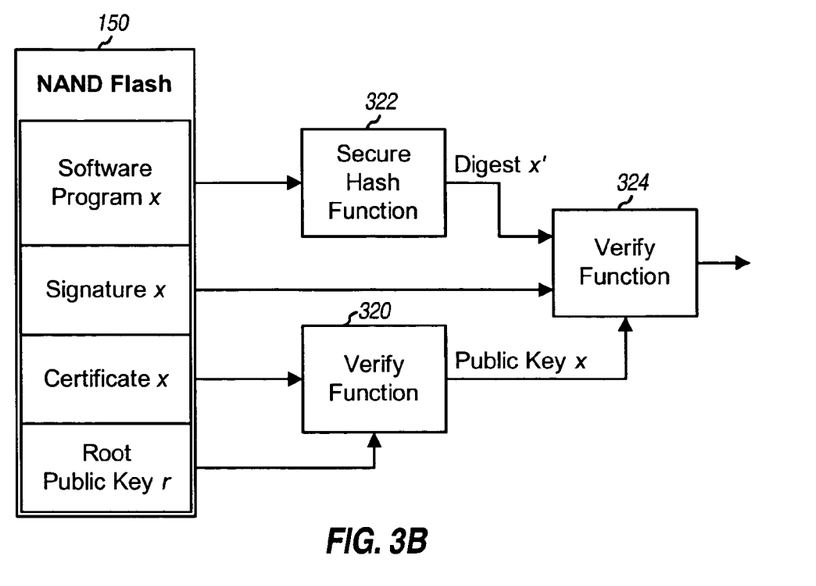

FIGS. 3A and 3B show an embodiment of a process to authenticate software program x using a digital signature. Software program x may be the boot code or a higher-level program. This embodiment uses two sets of cryptographic keys: (1) a set of private and public keys to sign and authenticate software program x, which are referred to as private key x and public key x, and (2) a set of private and public keys to identify and authenticate the source entity, which are referred to as the root private and public keys r. The root private key r and private key x are secret and only known to the source entity. The root public key r is made available to the wireless device and is used to verify signatures generated with the root private key. Public key x is used to verify signatures generated with private key x.

FIG. 3A shows the processing performed at the source entity. Software program x is hashed by a secure hash function 310 to generate a digest, which is called digest x. Secure hash function 310 may implement SHA-1, SHA-2, MD-5, or some other secure hash algorithm. A sign function 312 generates a signature over digest x using private key x. This signature is referred to as signature x. Sign function 312 may implement the RSA (Rivest, Shamir, and Adleman) algorithm, the Digital Signature Standard (DSS) algorithm, or some other cryptographic (digital signature or encryption) algorithm known in the art. Software program x and signature x may be stored in the main area of the NAND Flash.

A sign function 314 generates a signature over public key x and possibly other information using the root private key r. This signature is referred to as signature cx and is used to authenticate the source entity. Sign function 314 may implement the RSA, DSS, or some other cryptographic algorithm. Sign functions 312 and 314 may implement the same or different cryptographic algorithms. A certificate generator 316 forms a certificate containing signature cx, public key x, and possibly other information such as an identifier for the source entity, the cryptographic algorithm selected for use, the expiration date of the certificate, and so on. This certificate is referred to as certificate x and may be stored as an X.509 certificate or in some other format known in the art. Certificate x may be stored in the main area of the NAND Flash. The root public key r may be stored anywhere in the NAND Flash or may be made available to the wireless device in other manners, e.g., stored within the wireless device.

FIG. 3B shows the processing performed at the wireless device to authenticate software program x. The root public key r and certificate x are retrieved from the NAND Flash. A verify function 320 extracts signature cx and public key x from certificate x, verifies signature cx with the root public key r, and provides public key x if signature cx is verified. For the embodiment shown in FIGS. 2A and 2B, the root public key r is stored in the NAND Flash and is verified by the secure hash algorithm against the digest stored in the OTP area of the NAND Flash. Hence, any tampering with certificate x by a third party can be easily detected by signature cx not verifying.

Software program x is retrieved from the NAND Flash and hashed by a secure hash function 322 to generate a digest, which is referred to as digest x'. Secure hash function 322 implements the same secure hash algorithm used by secure hash function 310 at the source entity. A verify function 324 receives digest x' from secure hash function 322, signature x from the NAND Flash, and public key x from verify function 320. Verify function 324 verifies signature x with public key x and digest x' and indicates whether or not signature x is verified. Public key x is authenticated with the root public key r, which in turn is authenticated by the boot code digest stored in the OTP area of the NAND Flash. Hence, any tampering with software program x and/or signature x by a third party can be easily detected by signature x not verifying.

The embodiment shown in FIGS. 3A and 3B allows one root public key r to authenticate any number of software programs. A signature may be generated for each software program with a private key for that program, and a certificate may be generated for the program with the root private key r. The root public key r may be used to authenticate the certificate for each software program, and the public key within the authenticated certificate may be used to authenticate the program's signature.

Figure 4:
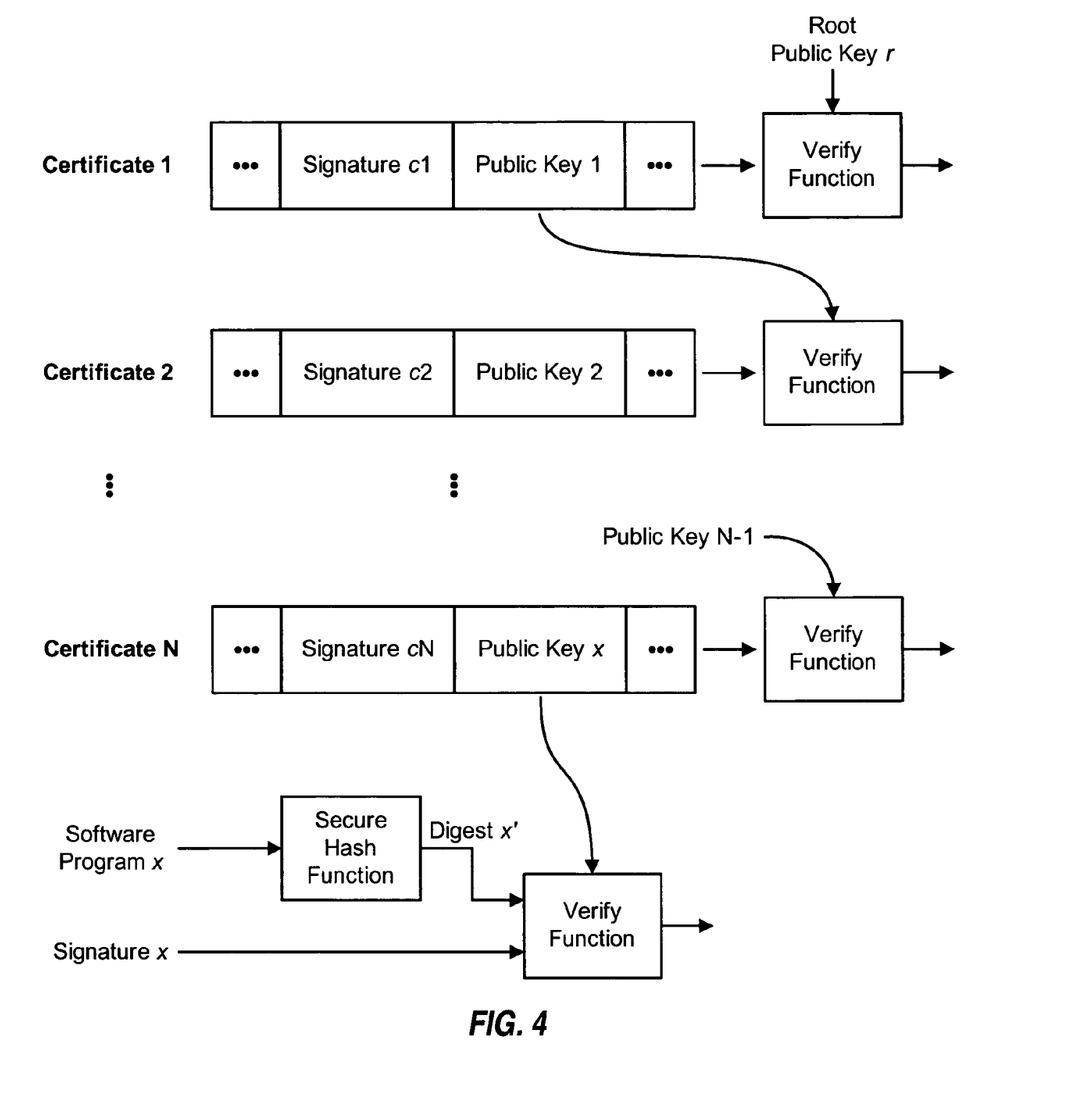
FIG. 4 shows multiple levels of authentication with certificates.

FIG. 4 shows an embodiment of N levels of authentication with certificates, where N may be any positive value. For this embodiment, certificate 1 contains (1) signature c1 that is generated with the root private key r, (2) public key 1 and (3) possibly other information that is not shown in FIG. 4. In general, certificate n, for n=1, . . . , N, contains (1) signature cn that is generated with private key n−1, (2) public key n and (3) possibly other information. Private key 0 is the root private key r. Public key N may be public key x for software program x to be authenticated. For the first level of authentication, certificate 1 is authenticated by verifying signature c1 with the root public key r. If signature c1 is verified, then for each subsequent level n of authentication, certificate n for that level is authenticated by verifying signature cn with public key n−1 from the prior level. If all N levels are authenticated, then public key x may be used to authenticate software program x, as described above for FIG. 3B.

Multiple levels of authentication may be used for a multi-tier cryptographic key hierarchy. Certificate 1 may be used to authenticate a root certificate authority (CA) that acts as the foundation of trust. Since the root certificate authority's private keys r are the foundation of trust, steps are taken to protect these private keys, and therefore their use is restricted. Additional levels of intermediate certificate authorities may be created which are more "expendable." Organizationally, the multi-tier key hierarchy is convenient because the verification chain of certificates may be generated by the organizations that produce the software programs. Hence, portions of the software programs loaded onto the wireless device may be individually customized by different wireless device manufacturers.

In another embodiment, a software program (which may be the boot code or a higher-level program) is signed with a private key, and the corresponding public key is stored in the OTP area of the NAND Flash.

In general, the software programs may be authenticated using secure hash, digital signature, encryption, and/or other cryptographic techniques. Authentication is achieved based on secure data that is stored in the OTP area of the NAND Flash. The data considered secure is integrity protected, i.e., not easily modified or tampered with. The secure data may include one or more digests, signatures, certificates, cryptographic keys, and so on, or any combination thereof.

Figure 5:
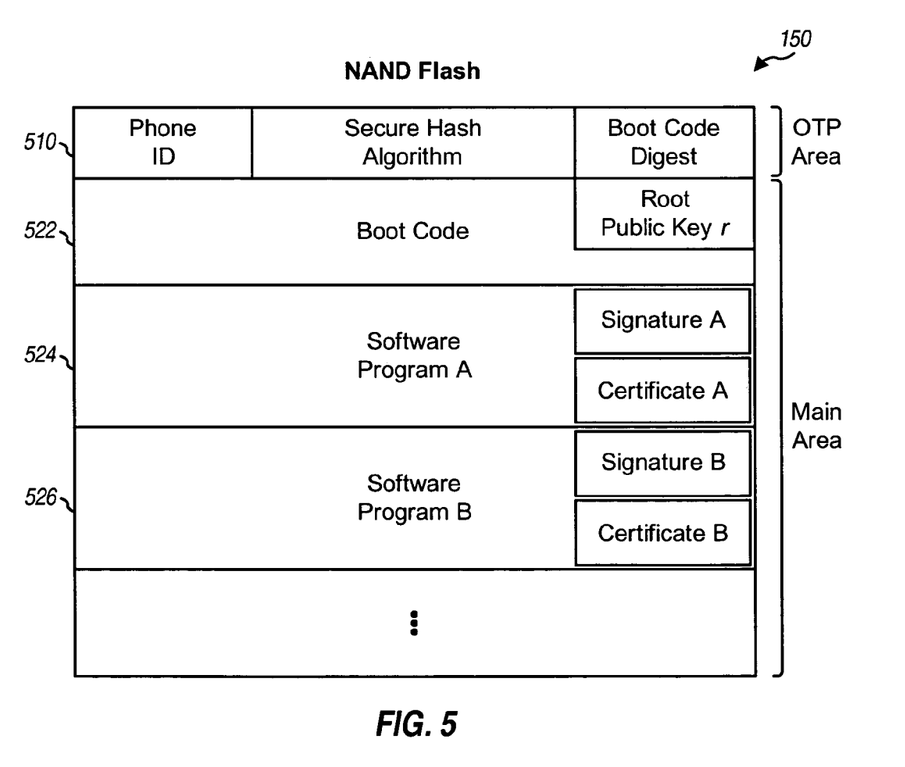
FIG. 5 shows a NAND Flash with an OTP area and a main area.

FIG. 5 shows an embodiment of NAND Flash 150, which includes an OTP area and a main area. For the embodiment shown in FIG. 5, OTP area 510 stores an identifier for the wireless device (phone ID), the secure hash algorithm used for the boot code, and a hash digest generated by the source entity for the boot code and the root public key. The phone ID may be an Electronic Serial Number (ESN), a Mobile Equipment Identifier (MEID), or some other type of identifier that is unique to the wireless device. The phone ID may be used to ensure that the NAND Flash is used for the proper wireless device. The secure hash algorithm may be stored in the OTP area of the NAND Flash and retrieved for use by digital section 120 during the boot up process. Alternatively, the secure hash algorithm may be resident within digital section 120 and not stored in the OTP area. The boot code digest may be generated based on the boot code and the root public key, as shown in FIG. 2A. The root public key is used to authenticate certificates generated by the source entity and is verified by the secure hash algorithm during boot to check for its validity. Alternatively, the root public key may be stored within the wireless device, e.g., inside digital section 120.

The boot code is stored in a section 522 of the main area of the NAND Flash. The boot code is typically the first program to be loaded and executed after the secure data and hash algorithm verify the validity of the boot code during the boot up process. The boot code initializes and configures the wireless device and then retrieves, verifies, and executes higher level software programs. Software program A is stored in a section 524 of the main area of the NAND Flash. A signature and a certificate may be generated for software program A (e.g., as shown in FIG. 3A) and stored in section 524 as signature A and certificate A, respectively. Software program A may be the second program to be loaded and executed during the boot up process, e.g., if the boot code is authenticated. Software program B is stored in a section 526 of the main area of the NAND Flash. A signature and a certificate may be generated for software program B (e.g., as shown in FIG. 3A) and stored in section 526 as signature B and certificate B, respectively. Software program B may be the third program to be loaded and executed during the boot up process, e.g., if software program A is authenticated. Other software programs may also be stored in the NAND Flash. Each software program may include a signature and a certificate used to authenticate that software program.

In general, the NAND Flash may store any number of software programs and any type of software program. The software programs may be loaded and executed in any order. In an embodiment, the software programs are loaded in a hierarchical or sequential order, e.g., the boot code first, then software program A, then software program B, etc. This sequential loading allows one program to authenticate another program. For example, software program A may contain basic functions that initialize the hardware within the wireless device. Software program B may contain custom functions and features that rely on the basic functions provided by software program A. Software program A may be generated by a designer of the wireless device, and software program B may be generated by a vendor or an original equipment manufacturer (OEM) to customize the wireless device.

Figure 6:
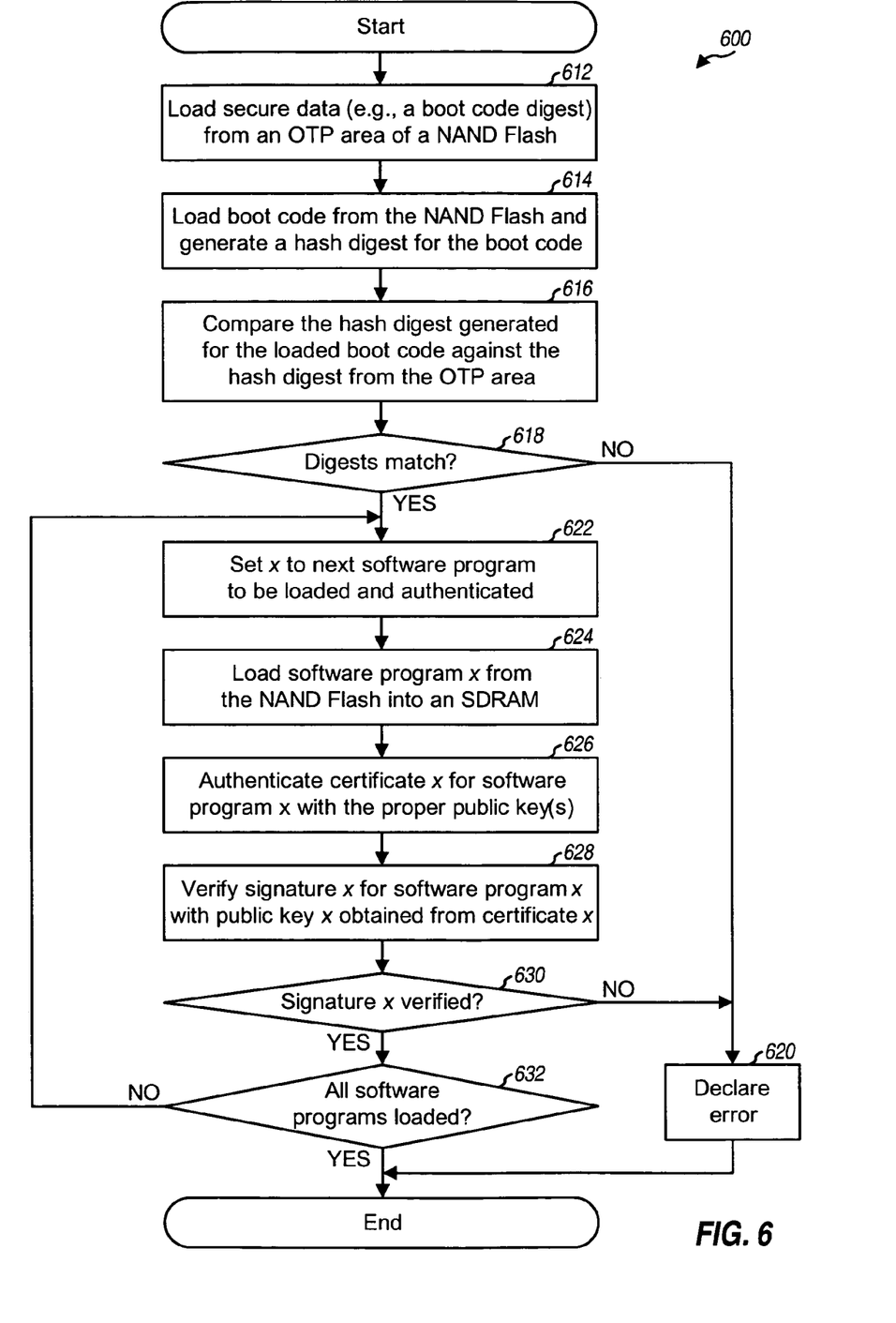
FIG. 6 shows a process for performing a secure boot from the NAND Flash.

FIG. 6 shows an embodiment of a process 600 for performing a secure boot from the NAND Flash. Process 600 may be performed, e.g., when the wireless device is powered on. Initially, secure data is loaded from the OTP area of the NAND Flash into the SRAM within the digital section (block 612). The secure data may include any data used to authenticate the content of the NAND Flash. For the embodiment shown in FIG. 5, the secure data includes the boot code digest and the secure hash algorithm. The secure data may include other types of data for other embodiments.

The boot code is then loaded from the NAND Flash into the SRAM and/or SDRAM (block 614). A hash digest is generated based on the loaded boot code using the same secure hash algorithm used at the source entity for the boot code (also block 614). Since the NAND Flash is more prone to bit errors, an error correction code (ECC) and/or error detection code may be used to reduce the probability of data error and to ensure data integrity when loading data from the NAND Flash.

The hash digest generated from the loaded boot code is then compared against the hash digest stored in the OTP area (block 616). If the generated hash digest does not match the stored hash digest, as determined in block 618, then an error is declared (block 620), and the boot up process terminates. The user may be notified via an error message and/or other appropriate actions may be taken in block 620.

If the generated and stored hash digests match and the answer is 'Yes' for block 618, then the boot code is authenticated. The boot code may be executed and may control and/or direct the remaining boot up process. For example, the boot code may initiate NAND Flash controller 140 and SDRAM controller 142 to load the remaining software programs directly from the NAND Flash to the SDRAM.

Index x is set to the next software program to be loaded and authenticated (e.g., x=A for NAND Flash 150 in FIG. 5) (block 622). Software program x is then loaded from the NAND Flash into the SDRAM (block 624). Certificate x and signature x for software program x are also loaded from the NAND Flash. Certificate x is authenticated with the proper public key(s), e.g., the root public key, as described above for FIGS. 3B and 4 (block 626). If certificate x is authenticated, then signature x is verified with the loaded software program x and public key x obtained from certificate x, as also described above for FIGS. 3B and 4 (block 628).

A determination is then made whether signature x is verified (block 630). If the answer is 'No', then an error is declared and/or other actions may be taken (block 620), and the boot up process terminates. Otherwise, if signature x is verified, then software program x is allowed to execute. Software program x and/or the boot code may load the next software program. A determination is then made whether all software programs have been loaded (block 632). If the answer is 'No', then the process returns to block 622 to load the next software program. Otherwise, if all software programs have been loaded, then the process terminates.

For the embodiment shown in FIG. 6, the software programs may be loaded in a hierarchical order. Each software program may be authenticated by a prior program based on the cryptographic data (e.g., signature, certificate, and/or cryptographic key) stored for that software program. The authentication process may utilize secure data stored in the OTP area. The authentication process may originate from the secure data (e.g., the root public key, which may be a part of, or authenticated by, the secure data stored in the OTP area) and may chain up any number of levels. Each authenticated program is allowed to execute and may initialize the appropriate hardware within the wireless device. Each authenticated program may also be trusted to authenticate other higher-level program(s). All programs that are authenticated back to the root can be trusted.

The load-and-authenticate process may continue until all pertinent programs have been loaded from the NAND Flash to the SDRAM. The operating system may start processes as soon as a sufficient number of programs have been loaded, without having to wait until all programs are loaded into the SDRAM. After the last program has been loaded, the wireless device is fully functional.

The hash digest for the boot code is generated based on the entire boot code, as shown in FIG. 2A. The signature for software program x is generated based on digest x, which is generated based on the entire software program, as shown in FIG. 3A. The authentication of a given software program (which may be the boot code or a higher-level program) may be expedited by performing the hash computation on the fly as the software program is loaded from the NAND Flash.

Data is read from the NAND Flash in units of pages, one page at a time, with each page being of a particular size (e.g., 512 bytes). To read a page of data from the NAND Flash, the NAND Flash is first activated, a read command is sent to the NAND Flash, and a page address is also sent to the NAND Flash. The selected page of data is then transferred from a NAND array to a NAND buffer within the NAND Flash. This page transfer takes some amount of time. When the page transfer is completed, the NAND Flash indicates that it is ready by bringing a Ready/Busy signal to logic high. At this point, the page of data may be read from the NAND Flash by providing a read clock.

In an embodiment, a hash digest is generated by hashing one page of data at a time. After a page of data has been loaded from the NAND Flash, a command to read the next page is sent to the NAND Flash. While the NAND Flash is busy transferring the next page from the NAND Flash's cell array to the NAND Flash's internal buffer, the hash digest is computed (e.g., by processor 124 in FIG. 1) for the page just loaded. Once the last page has been loaded from the NAND Flash, the hash computation is performed for the last page, and the hash digest is generated shortly thereafter. Since a software program may be stored in many pages, computing the hash digest as each page is loaded may substantially shorten the amount of time to perform the hash, which may shorten the boot up process.

For clarity, the secure boot techniques have been described with secure data stored in an OTP area. In general, secure data may be stored in any secure area of a storage device. A secure area is an area that is non-writable and not easily altered or modified. For example, secure data may be stored in an OTP area, a one-time write (OTW) area, a read-only memory (ROM) area, a lock-able area with a lock control to prevent writing to the area, or some other non-writable area.

For clarity, the secure boot techniques have been described for a NAND Flash having an OTP area. NAND Flash have various desirable features such as high storage capacity, low cost, good erase and program characteristics, good data transfer speed for continued access, and so on. The techniques may also be used for other types of memory devices (e.g., a NOR Flash) and other types of storage devices (e.g., memory cards, hard disks, compact discs (CDs), and so on). For all of these storage devices, the secure data stored in the non-writable (e.g., OTP) area may be trusted to a sufficient degree and may be used as the secure root for authenticating software programs stored in the main area of the storage devices.

The secure boot techniques may be used for a wireless device that may communicate with one or more wireless wide area network (WEANS), wireless local area networks (PLANS), wireless personal area networks (SPANS), and/or other wireless networks. A WAN may be a Code Division Multiple Access (COMA) network, a Global System for Mobile Communications (GEM) network, a Universal Mobile Telecommunications System (UMPS) network, etc. A COMA network implements coma2000, which covers IS-95, IS-2000, IS-856, etc. A UMPS network implements Wideband-COMA (W-COMA). W-COMA and GEM are described in documents from a consortium named "3rd Generation Partnership Project" (3GPP). coma2000 is described in documents from a consortium named "3rd Generation Partnership Project 2" (3GPP2). 3GPP and 3GPP2 documents are publicly available. The secure boot techniques may also be used for other electronics devices.

Figure 7:
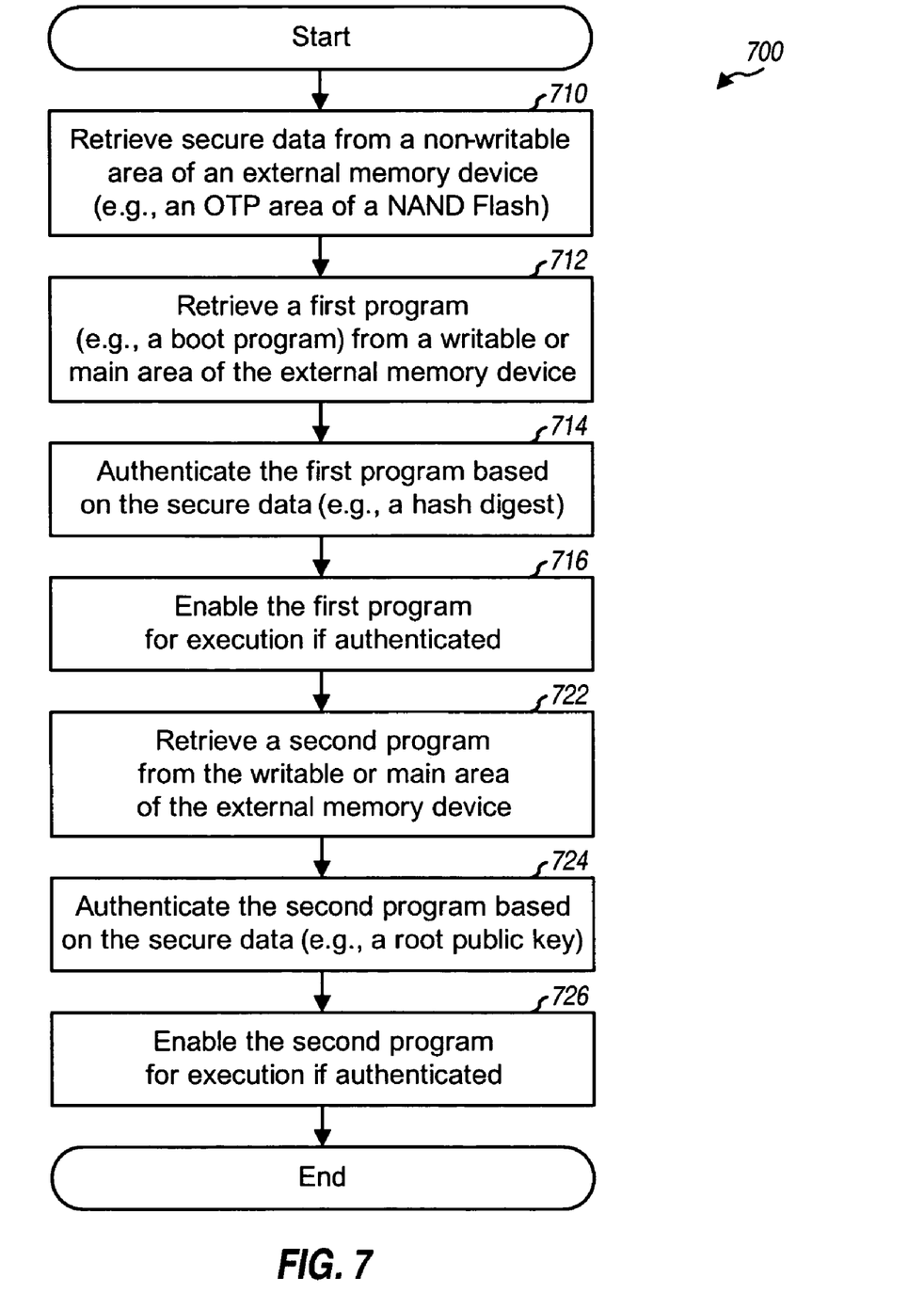
FIG. 7 shows a process for authenticating software programs.

FIG. 7 shows an embodiment of a process 700 for authenticating software programs in an electronics device. Secure data is retrieved from a non-writable area of an external memory device (e.g., an OTP area of a NAND Flash) (block 710). A first program (e.g., a boot program) is retrieved from a writable or main area of the external memory device (block 712) and authenticated based on the secure data (block 714). For example, the secure data may comprise a first hash digest along with the hash algorithm to be executed. The first program may then be authenticated by (1) hashing the first program to generate a second hash digest and (2) comparing the first and second hash digests. The first program is enabled for execution if authenticated (block 716).

A second program may be retrieved from the writable or main area of the external memory device (block 722) and authenticated based on the secure data (block 724). For example, the secure data may comprise a cryptographic key. The second program may then be authenticated by (1) retrieving a certificate containing a first signature and a public key from either the writable or non-writable area of the external memory device, (2) retrieving a second signature for the second program from either the writable or non-writable area, (3) verifying the first signature with the cryptographic key to authenticate the certificate, and (4) verifying the second signature with the public key from the certificate to authenticate the second program. The second program is enabled for execution if authenticated (block 726). Additional programs may be retrieved and authenticated.

The secure boot techniques described herein may be implemented by various means. For example, these techniques may be implemented in hardware, firmware, software, or a combination thereof. For a hardware implementation, the processing units used to perform secure boot may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

The techniques may also be implemented with firmware and/or software modules (e.g., procedures, functions, etc.) that perform the functions described herein. The modules may be stored in a memory (e.g., SRAM 132, NAND Flash 150, and/or SDRAM 152 in FIG. 1) and executed by a processor (e.g., processor 130).

The previous description of the disclosed embodiments is provided to enable any person skilled in the art to make or use the present invention. Various modifications to these embodiments will be readily apparent to those skilled in the art, and the general principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   at least one processor configured to
      retrieve secure data from a non-writable area of an external memory device, wherein the external memory device is coupled to the processor,
      retrieve a first program and a second program from a writable area of the external memory device,
      authenticate the first program and the second program based in part on the secure data,
      enable execution of the first program if the first program is authenticated, and
      enable execution of the second program if the second program is authenticated and after execution of the first program is enabled; and
   an internal memory coupled to the at least one processor.

2. The apparatus of claim 1, wherein the secure data comprises a first hash digest, and the at least one processor is further configured to
   hash the first program to generate a second hash digest, and
   compare the first and second hash digests to authenticate the first program.

3. The apparatus of claim 1, wherein the at least one processor is configured to verify a signature for the first program with a cryptographic key to authenticate the first program, wherein the cryptographic key is obtained from or authenticated by the secure data.

4. The apparatus of claim 2, wherein the at least one processor is further configured to
   retrieve a first signature and a certificate comprising a second signature and a second program public key from the external memory device, the first signature and the certificate associated with the second program,
   extract the second signature and the second program public key from the certificate,
   verify the second signature with a cryptographic key to authenticate the certificate, wherein the cryptographic key is obtained from or authenticated by the secure data, and
   verify the first signature with the second program public key to authenticate the second program.

5. The apparatus of claim 1, wherein the first program is a boot code that boots up the apparatus.

6. The apparatus of claim 4, wherein the second program is authenticated by the first program.

7. The apparatus of claim 1, wherein the external memory device is a NAND Flash device.

8. The apparatus of claim 1, wherein the external memory device is a NOR Flash device.

9. The apparatus of claim 1, wherein the non-writable area is a one-time programmable (OTP) area.

10. A method comprising:
    retrieving secure data from a non-writable area of an external memory device, wherein the external memory device is coupled to a processor;
    retrieving a first program and a second program from a writable area of the external memory device;
    authenticating the first program and the second program based in part on the secure data;
    enabling execution of the first program if the first program is authenticated; and
    enabling execution of the second program if the second program is authenticated and after execution of the first program is enabled.

11. The method of claim 10, wherein the secure data comprises a first hash digest, and wherein the authenticating the first program comprises:
    hashing the first program to generate a second hash digest; and
    comparing the first and second hash digests to authenticate the first program.

12. The method of claim 11, wherein the authenticating the second program comprises:
    retrieving a first signature and a certificate comprising a second signature and a second program public key from the external memory device, the first signature and the certificate associated with the second program;
    extracting the second signature and the second program public key from the certificate;
    verifying the second signature with a cryptographic key to authenticate the certificate, wherein the cryptographic key is obtained from or authenticated by the secure data; and
    verifying the first signature with the second program public key to authenticate the second program.

13. An apparatus comprising:
    means for retrieving secure data from a non-writable area of an external memory device, wherein the external memory device is coupled to a processor;
    means for retrieving a first program and a second program from a writable area of the external memory device;
    means for authenticating the first program and the second program based in part on the secure data;
    means for enabling execution of the first program if the first program is authenticated; and
    means for enabling execution of the second program if the second program is authenticated and after execution of the first program is enabled.

14. The apparatus of claim 13, wherein the secure data comprises a first hash digest, and wherein the means for authenticating the first program comprises:
    means for hashing the first program to generate a second hash digest; and
    means for comparing the first and second hash digests to authenticate the first program.

15. The apparatus of claim 13, wherein the means for authenticating the second program comprises:
  means for retrieving a first signature and a certificate comprising a second signature and a second program public key from the external memory device, the first signature and the certificate associated with the second program;
  means for extracting the second signature and the second program public key from the certificate;
  means for verifying the second signature with a cryptographic key to authenticate the certificate, wherein the cryptographic key is obtained from or authenticated by the secure data; and
  means for verifying the first signature with the second program public key to authenticate the second program.

16. A wireless communication device comprising:
  at least one processor configured to
    retrieve secure data from a one-time programmable (OTP) area of a Flash device, wherein the Flash device is coupled to the processor,
    retrieve a boot program and a second program from a main area of the Flash device,
    authenticate the boot program and the second program based in part on the secure data,
    enable execution of the boot program if the boot program is authenticated, and
    enable execution of the second program if the second program is authenticated and after execution of the boot program is enabled; and
  a memory coupled to the at least one processor.

17. The device of claim 16, wherein the secure data comprises a first hash digest, and the at least one processor is further configured to
  hash the boot program to generate a second hash digest, and
  compare the first and second hash digests to authenticate the boot program.

18. The device of claim 17, wherein the at least one processor is configured to
  retrieve the boot program from the main area of the Flash device one page at a time, and
  hash the boot program one page at a time, as the page is retrieved from the Flash device, to generate the second digest.

19. The device of claim 17, wherein the at least one processor is further configured to
  retrieve a first signature and a certificate comprising a second signature and a second program public key from the Flash device, the first signature and the certificate associated with the second program,
  extract the second signature and the second program public key from the certificate,
  verify the second signature with a cryptographic key to authenticate the certificate, wherein the cryptographic key is obtained from or authenticated by the secure data, and
  verify the first signature with the second program_public key to authenticate the second program.

20. The device of claim 19, wherein the at least one processor is further configured to
  retrieve the second program from the main area of the Flash device one page at a time,
  hash the second program one page at a time, as the page is retrieved from the Flash device, to generate a hash digest, and
  verify the first signature with the public key and the hash digest.

21. The apparatus of claim 1, wherein the at least one processor is configured to:
  retrieve a second program from the writable area of the external memory device;
  retrieve a first signature and a first certificate for the second program from the external memory device, the first certificate comprising a second signature and a second program public key; and
  verify the second signature with a cryptographic key retrieved from the external memory device, wherein successful verification of the second signature provides the second program public key for verification of the first signature to authenticate the second program.

22. The apparatus of claim 1, wherein the external memory device is removably coupled to the apparatus.

23. The apparatus of claim 1, wherein the at least one processor retrieves the secure data and first program from the external memory device and executes the first program during a boot up process of the apparatus.

24. A non-transitory processor-readable medium comprising instructions operational for securely booting a wireless device from an external memory device, which when executed by one or more processors causes the processors to:
  retrieve secure data from a non-writable area of the external memory device, wherein the external memory device is coupled to the one or more processors;
  retrieve a first program and a second program from a writable area of the external memory device;
  authenticate the first program and the second program based in part on the secure data;
  enable execution of the first program if the first program is authenticated; and
  enable execution of the second program if the second program is authenticated and after execution of the first program is enabled.

25. The non-transitory processor-readable medium of claim 24, wherein the one or more processors retrieve the secure data and first program from the external memory device and executes the first program during a boot up process of the apparatus.

26. The non-transitory processor-readable medium of claim 24, wherein the secure data comprises a first hash digest, and the instructions further cause the processors to:
  hash the first program to generate a second hash digest; and
  compare the first and second hash digests to authenticate the first program.

27. The non-transitory processor-readable medium of claim 26, wherein the instructions further cause the processors to:
  retrieve a first signature and a certificate comprising a second signature and a second program_public key from the external memory device, the first signature and the certificate associated with the second program,
  extract the second signature and the second program public key from the certificate,
  verify the second signature with a cryptographic key to authenticate the certificate, wherein the cryptographic key is obtained from or authenticated by the secure data, and
  verify the first signature with the second program_public key to authenticate the second program.

28. The apparatus of claim 2, wherein the at least one processor is further configured to:
  retrieve a second program from the writable area of the external memory device;

retrieve a second program signature and a plurality of certificates associated with the second program from the external memory device, wherein the plurality of certificates are arranged in a hierarchy comprising a first certificate 1 and a last certificate N, the last certificate N including a last signature and a last public key;

authenticate the plurality of certificates to verify the last signature;

provide the last public key upon authentication of the last signature;

verify the first signature with the last public key to authenticate the second program.

29. The apparatus of claim 4, wherein the cryptographic key is a public root key.

30. The apparatus of claim 4, wherein the first program is a boot program that boots up the apparatus, and the second program is a higher-layer program.

31. The device of claim 19, wherein the Flash device is a NAND Flash device.

* * * * *